United States Patent [19]
Sabatino

[11] 3,798,071
[45]* Mar. 19, 1974

[54] MAKING ELECTRICAL CONNECTIONS THROUGH A STORAGE BATTERY WALL

[75] Inventor: Anthony Sabatino, St. Paul, Minn.

[73] Assignee: Gould Inc., Mendota Heights, Minn.

[ * ] Notice: The portion of the term of this patent subsequent to Nov. 6, 1990, has been disclaimed.

[22] Filed: June 5, 1969

[21] Appl. No.: 830,834

Related U.S. Application Data
[63] Continuation-in-part of Ser. No. 668,395, Sept. 18, 1967.

[52] U.S. Cl. .............................. 136/134 R, 136/176
[51] Int. Cl. ............................................. H01m 5/00
[58] Field of Search ............................ 136/134, 176

[56] References Cited
UNITED STATES PATENTS
3,336,164 8/1967 Miller ................................. 136/134
3,350,236 10/1967 Niemann .............................. 136/134
3,508,318 4/1970 Clingenpeel et al. ................ 29/204
3,703,589 11/1972 Rigsby ................................. 136/176

Primary Examiner—Donald L. Walton
Attorney, Agent, or Firm—Jacobson and Johnson

[57] ABSTRACT

Two connector members, one on each side of the battery wall, are brought close to one another through an opening in the wall. The parts are then joined together by fusion and after fusing, pressure is applied to force the members to press firmly and securely against the respective sides of the wall to produce a tight seal against leakage of fluid through the opening in the wall.

3 Claims, 6 Drawing Figures

MAKING ELECTRICAL CONNECTIONS THROUGH A STORAGE BATTERY WALL

CROSS REFERENCE TO RELATED APPLICATIONS

This application is a continuation-in-part of my application filed Sept. 18, 1967, Ser. No. 668,395, and assigned to the same assignee as the present invention.

BACKGROUND OF THE INVENTION

1. Field of the Invention

This invention is generally related to the process of forming storage batteries electrical connections through partitions between cells or through an outer wall of the battery casing and, more particularly, for forming the connection in such a manner that the electrolyte or any other fluids cannot seep out or leak out through the opening in the wall or partition.

2. Description of the Prior Art

A variety of through-partition connectors and methods of making connections of this nature have been developed over the years. Typifying some of the prior art is the Miller Patent 3,336,164 titled "Storage Battery Intercell Connectors" and various references cited therein as well as Frischkorn et al; U.S. Pat. No. 3,275,793, issued Sept. 27, 1966. The present invention is an improvement over the prior art as represented by the foregoing, particularly because it provides a more secure and reliable sealing of the opening through the battery wall.

SUMMARY

In the preferred embodiment of the invention, an opening through the wall is pre-formed, such as by punching. The two members of the connector are placed on opposite sides of the wall facing each other through the opening and are brought close to one another through the prepunched opening. The members are held firmly in this position while being solidly fused together through an opening in one of the members. After fusion, pressure is applied to force bearing surfaces on the two members firmly against the respective sides of the wall to form a seal around the edge of the opening in the wall. As a feature of this invention, each of the members may be constructed with an extension which will enter part way into the pre-formed opening through the wall so that the pieces are easily aligned for assembly and may be butted against one another within the wall opening. In addition, by making each connector member with a small extension the members can be easily inserted into the cell compartment when assembling batteries having casing walls made out of relatively hard materials.

As a further feature of this invention, the extension on one of the members can be made in the form of a sleeve which will protect the wall against charring when the members are fused together.

DESCRIPTION OF THE PREFERRED EMBODIMENTS

In past practice electrical connections between cells within a storage battery casing or electrical connections from the cell to an external terminal were made by routing the connector over the cell partition walls or through the cover of the battery casing to prevent leakage of liquid between cells or out of the battery casing. This type of connector construction was not only costly and time consuming in assembling batteries but also added resistance to the conductors because of the added length of the intercell connector and was often times the cause of battery failures. To overcome these disadvantages, a variety of connectors passing through the walls or partitions have been developed. Some of these are the three-element variety and some of the more recent developments are the two-member construction. The greatest advantage of the latter is that the likelihood of corrosion is reduced considerably because only a single joint is necessary and it can be placed at the most convenient locations. The biggest disadvantage or obstacle to the use of a through-partition connector is the threat of leakage through the opening in the battery wall which this invention obviates.

Figure 1:
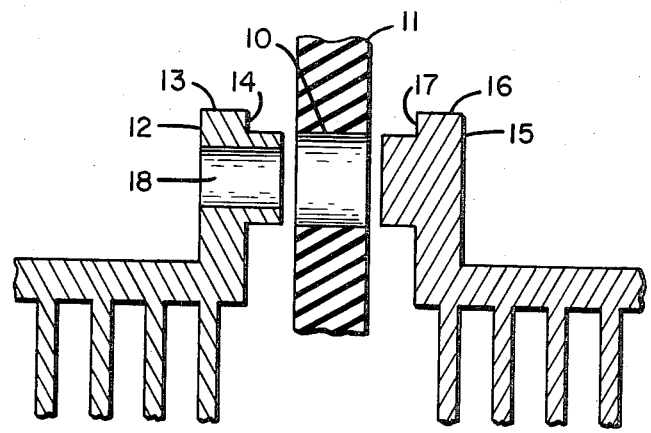
FIG. 1 is a sectioned illustration of the two mating members of a through-the-wall connector constructed according to the teachings of this invention as they appear aligned ready for insertion in the opening in the wall.
Figure 2:
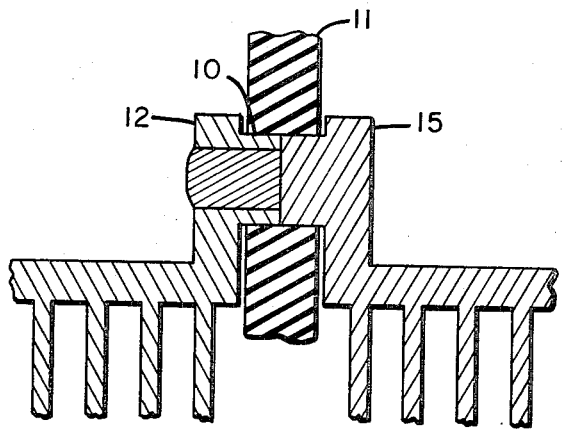
FIG. 2 illustrates, in section, the connector after the members have been joined and fused together but before the final axial pressure has been applied.

Turning now to the FIGS. 1 and 2 which illustrate an embodiment of this invention, a circular opening 10 is prepunched in any convenient manner through the battery partition or wall 11. One member 12 of the two-piece connector is shown on the lefthand side of wall 10 and is in the form of an annular sleeve having a flange 13 which defines an inner bearing surface 14 which, as will be described later, is eventually brought to bear against the left side of wall 11. On the right hand side of wall 11, the other member 15 of the two-piece connector is in the form of a solid pin which similarly has a flange 16 which also defines an inner bearing surface 17 for eventually bearing against the righthand side of wall 11. Ordinarily each connector member may be either integrally attached inside the cell to the battery plates or outside the casing to an external electrical terminal post. The former arrangement is illustrated in the drawings. Whether the respective members 12 and 15 are connected to plates or to an external terminal post depends upon their use, either as an intercell connector or a connector through an outside wall of the casing.

The dimensions of the respective connector members are selected so that their respective extensions will enter into the opening 10 in the wall 11. It is preferable that they be press-fitted into the opening but this is not critical. Preferably the length of the respective extensions of members 12 and 15 are chosen so that their ends are quite close to one another and even in contact within the confines of the wall 11. It is preferable that the extensions are of equal length so they meet or are close together at the middle of the wall, as illustrated in FIG. 2, but no limitation thereto is intended. Even when the ends are joined together, in a manner described later, the respective bearing surfaces 14 and 17 are not tight against the corresponding sides of wall 11. This is particularly true when the extensions are so close that they butt against one another as shown in FIG. 2.

When the members 12 and 15 are inserted into the opening 10, they are held in the opening 10 close to or against one another by a suitable fixture, not shown, and by applying heat and inserting a molten material such as lead through the opening 18 in annular sleeve member 12, the members are fused together. When the opening 18 is completely filled with lead and suitable heat applied for a suitable period of time to fuse the two members together, the connection is allowed to cool and harden so that the two members 12 and 15 are then solidly joined together to form a single integral connector as illustrated in FIG. 2. It can be observed that during this fusion step the sleeve portion of member 12 which is within the opening 10, acts as a barrier between the hot molten metal and the material in partition wall 11 to help prevent charring of the latter during the fusing operation.

After fusing the two members together, the connection through the wall is still generally somewhat loose fitting and there may even be a slight gap between the bearing surfaces 14 and 17 and the corresponding surface areas of the wall 11. At this time, again using a suitable fixture (not shown), pressure is applied axially on both sides of the connection from opposite sides of the wall 11. This causes a combination of radial expansion of that portion of the connector which is within the opening 10 as well as a distortion of flanges 13 and 16 on the respective sides of wall 11. The applied pressure forces the respective bearing surfaces 14 and 17 tightly against the corresponding sides of the wall 11 completely around the periphery of opening 10 to produce a very effective seal against leakage through the opening. It has been found that by applying the pressure to form this connector-to-wall seal in the manner described after the two connector members have been fused together a significant improvement in the quality and reliability of the seal is achieved.

One advantage of making relatively short extensions on the respective connector members so that they both extend part way into the opening 10 is that they are then easier to insert into the cell compartment especially when they are used in a battery casing with walls made out of relatively stiff or hard material. Materials of that nature ordinarily are relatively inflexible so that an overly long extension on one member might make it difficult to insert into the cell chamber when assembling the battery. On the other hand, however, where the walls are flexible enough to allow a longer extension, the pin on member 15 may be eliminated so it will have only a flat bearing surface against wall 11 and sleeve member 12 would then have an extension that passes substantially all the way through wall 11 to be adjacent or in contact with member 15 at the opposite side of the wall. Of course, having extensions on both members so both must be inserted at least part way into the wall opening permits them to be aligned easily with one another and with the wall opening.

Figure 3:
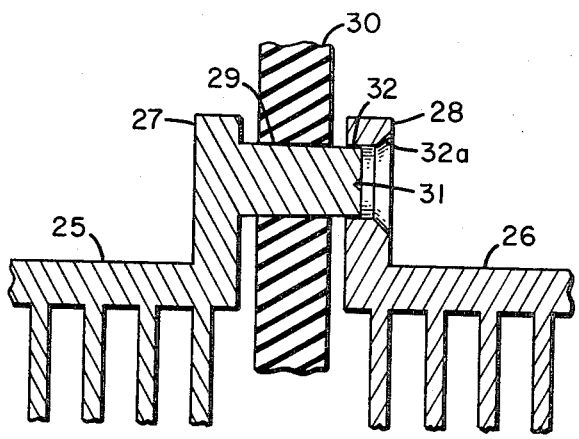
FIG. 3 is a sectioned illustration of the two mating members of a through-the-wall connector prior to assembly according to the teachings of this invention.
Figure 4:
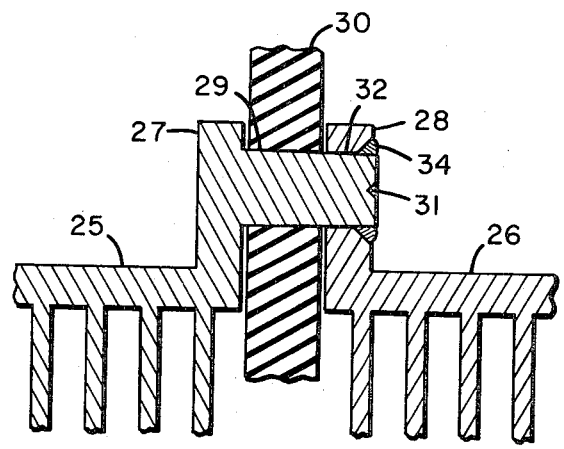
FIG. 4 illustrates in section, the two mating members that have been joined together through fusing but before the final axial pressure has been applied.
Figure 5:
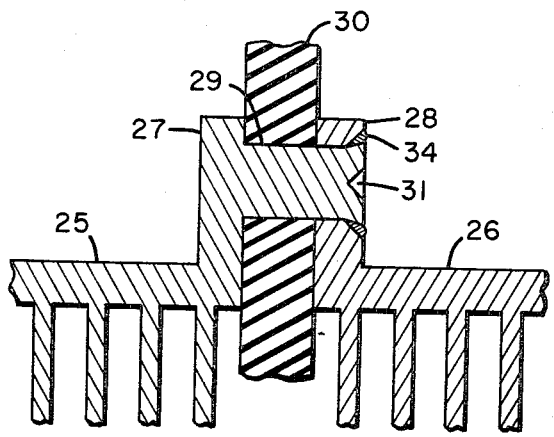
FIG. 5 illustrates, in section, the two mating members that have been joined together after the final axial pressure has been applied.

FIGS. 3 to 5 show a different type of intercell connector, which is shown and described in Miller U.S. Pat. No. 3,336,164, in the various stages of assembly according to my process. The male intercell connector comprises an intercell connector strap 25 which is integrally formed with a lug 27 and a male extension 29 with a flared recess 31 on the end of male extension 29. The female intercell connector comprises an intercell connector strap 26 which is integrally formed with a lug 28, which has a hole or an opening 32 that contains a flared portion 32a. Together these two straps form a two-piece intercell connector.

In the assembly of the intercell connector shown in FIGS. 3 to 5, male extension 29 is inserted through a pre-punched opening in wall 30 and into opening 32 in strap 26. This produces an annular flared recess region 33 between male extension 29 and opening 32. Next, a molten material 34 such as lead is puddled into the annular flared recess region 33 (FIG. 4). This fuses the two members into a single unit. The member is then allowed to cool and harden to form a single integral connector.

After fusing the two members together, the connectors are still somewhat loose fitting with respect to the intercell partition. In fact, there may even be a slight gap between the straps and intercell partition 30. The reason for the looseness is that, in contrast to prior art assembly techniques no pressure has been applied to the strap to force them together before fusing. Next, after fusing, pressure is applied to the back of connector strap 27 and to the back of connector strap 28 and the end of extension 29. This forces the two straps securely against intercell partition 30 as it also expands extension 29 thus forming a fluid tight integral connection between the two members.

Figure 6:
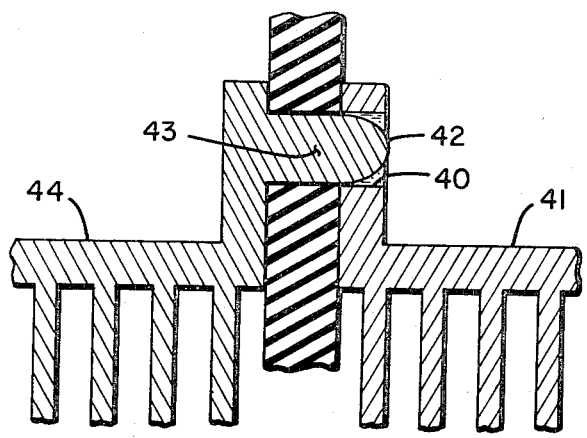
FIG. 6 illustrates in section the two mating members with the end of the extension of the male lug having a hemispherical end and a cylindrical opening in the female lug.

Although the method of securing the intercell connectors is shown with the recess region formed by the opening in the female connector, it is apparent that the end of male extension could be hemispherical and the opening could be cylindrical without a flared portion 32a. FIG. 6 shows this embodiment with a recess region formed by the inside of the cylindrical opening 40 of female lug 41 and the hemispherical end 42 of extension 43 on male lug 44. Also, the intercell connectors could each have a recess region so that molten material 34 would fill the entire recess region formed by the flared or annular region in each of the intercell connectors.

It is also envisioned that the recess region between connectors need not be flared but could be cylindrical or the like.

I claim:

1. A method of making an electrical connection through an insulating wall of a storage battery by fusing two members having a single fusion region into a unitary connector including the steps of:
    making a first mating member having an extension for extending completely through the opening in a battery wall and with a region for fusing to a second mating member, and making a bearing surface on said first mating member for facing an insulating wall and extending completely around the periphery of an opening in an insulating wall of a storage battery for thereby forming a leakproof seal around the opening in the insulating wall of a storage battery when said bearing surface of said first mating member is tightly pressing against the insulating wall of a storage battery;

making a second mating member having an opening for receiving the extension of said first mating member and for allowing fusion of said second mating member to said first mating member and making a bearing surface on said second mating member for facing an insulating wall and extending completely around the periphery of an opening in an insulating wall of a storage battery for thereby forming a leakproof seal around the opening in the insulating wall of a storage battery when said bearing surface on said second mating member is tightly pressing against the insulating wall of a storage battery;

making an opening through an insulating wall of a storage battery;

placing said first mating member having an extension and a region for allowing fusing of said first mating member to said second mating member on one side of the insulating wall of the storage battery;

placing said second mating member having an opening therein for allowing fusion of said first mating member to said second mating member on the opposite side of the insulating wall of the storage battery;

placing the extension of said first mating member through the opening in the insulating wall of the storage battery and into the opening in the second mating member to align the second mating member with said first mating member;

bringing said first mating member and said second mating member into position for fusion between said first mating member and said second mating member to thereby produce a recess region formed by the portion of the extension of said first mating member that is located in the opening in said second mating member and the portion of said second mating member that defines the opening in said second mating member so that the recess region provides a single fusion region at the end of the extension of said first mating member, and allowing spacing between said bearing surface on at least one of said mating members and said insulating wall;

next, solidly puddling lead into the recess region formed by the end of the extension of said first mating member and the opening in said second member to fuse said first mating member to said second mating member by puddling lead through the opening in said second mating member while at least one of said bearing surfaces on said mating members is spaced from said insulating wall;

allowing the puddled lead in the fused region to cool and harden so that the first mating member and said second mating member are solidly joined together in a single fusion joint to produce a unitary connection while allowing the bearing surface of at least one of said mating members to be spaced from the insulating wall of the storage battery; and then applying axial pressure on the unitary connection from opposite sides of the insulating wall until both of the bearing surfaces of said first mating member and said second mating member are tightly pressing against their respective corresponding wall surfaces and completely around the periphery of said wall opening to thereby seal the opening in the insulating wall of said storage battery against leakage.

2. The method of making electrical connections through an insulating wall of a storage battery as described in claim 1 wherein said extension on said first mating member is brought into the opening in said second mating member to thereby produce an annular recess region defined by the end of the extension of said first mating member and the opening in said second mating member.

3. The method as described in claim 1 wherein making a first mating member includes the step of making a rounded end on the end of said extension on said first mating member for extending completely through said insulated wall opening and into an opening in the said second mating member to thereby form a recess region between said mating members.

* * * * *